to pass the halocarbon in vapor form through the vessel. The process is frequently carried out by distributing a shallow layer of lead tetrafluoride throughout the length of a metal tube and passing a saturated halocarbon in vapor form through the tube. If desired, tubes with rectangular cross section may be used and the exposed surface of the layer of lead tetrafluoride thus increased. The mass may be agitated, if desired. The physical form of the lead tetrafluoride is preferably such that easy penetration of the mass of tetrafluoride by gases or vapors passing through the reaction vessel is facilitated. Granulated or coarsely powdered lead tetrafluoride has been found to be satisfactory.

The reaction vessel, which may be of iron, nickel or other material resistant to the reactants and reaction products under the conditions of fluorination and regeneration, is maintained at a desired reaction temperature by any convenient means. Heating may be effected in any one of a number of ways, such as by electrical resistance heaters, by gas flames, or by immersing the reaction vessel in a suitable high-boiling liquid, such as a low-melting alloy. The fluorination reaction is exothermic in nature and in large size reaction vessels heating may not be necessary after the reaction has started. In some instances, cooling may even be advisable.

Fluorination of a saturated halocarbon with lead tetrafluoride may be carried out with the halocarbon reactant in either liquid or gaseous phase. In practice, however, it has usually been found more convenient, especially when high temperatures are required, to pass the halocarbon reactant through the reactor in vapor form. In this way, the handling of organic liquids at high temperatures is avoided and the reaction may be carried out at ordinary pressures. A saturated halocarbon reactant may be introduced into the reaction vessel either in the form of its vapor or as a liquid. In the latter instance, the halocarbon is usually vaporized in the portion of the reaction vessel nearest the entry port and the vapors are then fluorinated as they pass through the remaining part of the vessel. In certain instances, the halocarbon reactant may be heated in a vessel separate from the fluorination vessel, a stream of inert gas, such as nitrogen, hydrogen fluoride, or helium, passed through the heated liquid, and the mixed vapors of inert gas and of saturated halocarbon reactant then passed into the fluorination vessel. Fluorination with the halocarbon reactant in the vapor phase is conveniently carried out at atmospheric pressure although it may, if desired, be carried out at a pressure higher or lower than atmospheric pressure.

Although fluorination of a saturated halocarbon in the vapor phase using lead tetrafluoride as the active fluorinating agent is usually carried out at a temperature between about 0° C., and about 500° C., it may be carried out at any convenient temperature above the condensing temperature of the vapors at the reaction pressure. In certain instances, the temperature of fluorination may even be maintained sufficiently high to cause fluorinolysis. Temperatures sufficiently high to cause the formation of substantial amounts of undesirable by-products are to be avoided.

After the lead tetrafluoride has been largely exhausted and converted substantially to lead difluoride, the reaction vessel may be purged with nitrogen or other inert gas to free it from most of the organic substances before elemental fluorine is admitted to the reaction vessel to regenerate lead tetrafluoride. In this way the possible explosive reaction of residual organic vapor with elemental fluorine within the reaction vessel is avoided. Regeneration of the spent lead tetrafluoride is, as noted above, carried out at a temperature above about 150° C., preferably at a temperature between about 250° C. and about 500° C.

As mentioned previously the process of the invention may, if desired, be carried out with the saturated halocarbon reactant in the liquid phase in which case the halocarbon and lead tetrafluoride may be mixed together in any convenient way, e. g., the halocarbon may be stirred in a vessel at the desired temperature and lead tetrafluoride added gradually thereto. Such procedure with the halocarbon reactant in the liquid phase is of particular value when the halocarbon boils at a high temperature. It has been found that that ratio of the amount of lead tetrafluoride to the amount of saturated halocarbon reactant necessary when a high degree of fluorination is to be effected is so great that when the reaction is carried out with the halocarbon reactant in liquid phase the final reaction mixture is frequently of a moist granular nature rather than of a fluid nature and is difficult to handle on a large scale. This difficulty may be overcome in a number of ways. Thus the liquid which is to be fluorinated may be diluted with a liquid inert under the reaction conditions, such as a high boiling fluorocarbon, to increase the proportion of liquid in the reaction mixture.

Alternatively, fluorination in the liquid phase may be carried out step-wise. Thus in the first step the addition of solid lead tetrafluoride to the liquid halocarbon reactant may be stopped while the mixture is still fluid enough to be agitated readily. The reaction product may be filtered or otherwise treated to separate the organic and inorganic portions thereof, the spent lead tetrafluoride regenerated with fluorine, and the partially fluorinated organic portion then fluorinated further by adding to it fresh or regenerated lead tetrafluoride. Although the invention is not limited to vapor phase procedures, it is readily apparent that in many instances the fluorination reaction is more conveniently carried out in vapor phase.

The degree of fluorination effected is dependent, among other factors, upon the reaction temperature and the time of contact of the halocarbon reactant with lead tetrafluoride. In order to effect a high degree of fluorination, e. g., perfluorination, of a saturated halocarbon in the vapor phase during a single pass through the reaction vessel, it may be necessary to pass the halocarbon vapor very slowly through the vessel thus limiting the rate at which a highly fluorinated product may be produced in any particular reaction vessel. It has also been found that many halocarbons are somewhat more thermally unstable in the unfluorinated or only lowly fluorinated state than when they are more highly fluorinated and that, when it is attempted to fluorinate such unfluorinated or lowly fluorinated halocarbons to produce a highly fluorinated halocarbon during a single pass of the vapor through the fluorination vessel, it may be necessary to elevate the temperature to such a degree that undesirable decomposition of the halocarbon reactant is effected before substantial fluorination occurs.

For these and other reasons it is sometimes convenient and desirable to recycle the halocarbon reactant after it has been partially fluorinated, usually after the spent lead tetrafluoride has been regenerated to insure there being a high proportion of lead tetrafluoride in the lead fluoride mass. This recycling of the organic product may be repeated as many times as is desirable or necessary to introduce the desired proportion of fluorine into the molecule and each recycling is preferably, but not necessarily, carried out at a temperature higher than the preceding one. In this way the first stages of fluorination, which do not require high temperatures and during which relatively unstable halocarbons may be present in the fluorination vessel, are carried out at a relatively low temperature while later stages of fluorination, which usually require a higher temperature and during which only relatively stable fluorine-containing halocarbons are present in the fluorination vessel, are carried out at a higher temperature. The same effect may be obtained by passing the halocarbon reactant through a number of reaction vessels or towers in series each containing lead tetrafluoride and each maintained at a reaction temperature which may, if desired, be higher than that of the preceding vessel. By a suitable arrangement of a number of reaction vessels in series, the process may be carried out continuously, it being only necessary to by-pass the vapors of the halocarbon reactant around any one of the reaction vessels while the spent lead tetrafluoride therein is being regenerated with fluorine.

It is to be noted that a chlorine, bromine or iodine atom replaced with a fluorine atom during the fluorination appears in the reaction product in elemental form. The effluent vapors from the reaction thus contain, in addition to the desired saturated fluorine-containing halocarbon, a halogen other than fluorine, and may contain unfluorinated or partially fluorinated saturated halocarbon reactant.

The reaction product is treated in any convenient manner to recover therefrom the desired saturated fluorine-containing halocarbon. One convenient way in the case of vapor phase fluorination consists in cooling and condensing the effluent vapors and treating the condensed liquid to separate therefrom the desired saturated fluorine-containing halocarbon. The liquid reaction product may be treated in any one of a number of ways. Thus the liquid may be fractionally distilled and the desired fraction collected, or it may be treated directly with a dilute aqueous alkali to free it from elemental halogen and then fractionally distilled. In any event the desired fluorine-containing fraction may be collected and any less highly fluorinated fractions may, if desired, be recycled to the fluorination vessel to increase the proportion of fluorine in the fraction.

In the case of fluorination with the saturated halocarbon reactant in the liquid state, the reaction mixture may be filtered or otherwise treated to separate the organic and inorganic constituents. The inorganic constituents, consisting mainly of spent lead tetrafluoride, may be dried, or washed with a low boiling organic liquid and dried, and then regenerated with elemental fluorine and recycled in the process. The organic constituents may be washed with water and with dilute aqueous alkali to free them from elemental halogen and the mixture then fractionally distilled. Inert liquid diluents and insufficiently fluorinated halocarbons collected during the distillation may be returned, either together or separtely, to the fluorination vessel and the fluorine content of the insufficiently fluorinated halocarbon increased by further treatment with fresh or regenerated lead tetrafluoride. Other ways of recovering the desired fluorine-containing halocarbon from the reaction mixture will be apparent to those familiar with the art and the present invention is not limited as to such methods of recovery.

Certain advantages of the invention may be seen from the following examples, which are given by way of illustration only and are not to be construed as limiting.

Example 1

An iron tube fitted with means for heating at any desired temperature was packed loosely with several mols of lead dichloride. The tube and contents were heated at about 300° C. and anhydrous hydrogen fluoride passed through the tube for several hours. Elemental fluorine was then passed through the tube for several hours until the gases issuing from the tube contained a high proportion of fluorine. The lead dichloride in the tube was thus converted almost entirely to lead tetrafluoride. The lead tetrafluoride was used without removal from the tube for fluorinating saturated halocarbons containing at least one atom of halogen other than fluorine.

Example 2

A reactor containing lead tetrafluoride similar to that described in Example 1 was heated at 150° C. and 1.5 mols of carbon tetrachloride was passed slowly through the reactor in vapor form over a period of eight hours. Effluent gases from the reactor were passed through a condenser cooled to a sufficiently low temperature to condense organic constituents in the vapors. The condensate was washed free of chlorine with alkali and the washed mixture fractionally distilled. Fractions were isolated consisting substantially of monochlorotrifluoromethane, dichlorodifluoromethane, and trichloromonofluoromethane, respectively.

Example 3

The fraction consisting essentially of trichloromonofluoromethane obtained in Example 2 was recycled through a fluorination reactor containing lead tetrafluoride of a temperature of 150° to 170° C. Effluent vapors were condensed as in Example 2. The condensate contained substantial fractions of dichlorodifluoromethane and monochlorotrifluoromethane.

Example 4

The fractions consisting essentially of dichlorodifluoromethane obtained in Examples 2 and 3 were combined and passed in vapor form through a fluorination reactor containing lead tetrafluoride heated at 150° to 170° C. The reaction product, obtained by condensing the effluent vapors from the reactor, contained a large proportion of monochlorotrifluoromethane.

Example 5

Trichlorononafluorocyclohexane is heated in a stream of nitrogen and the mixed vapors of the chlorofluoro compound and nitrogen passed slowly through a fluorination reactor containing lead tetrafluoride at a temperature of from 300°

Patented Mar. 6, 1951

2,544,560

UNITED STATES PATENT OFFICE 2,544,560

FLUORINATION OF SATURATED HALOCARBONS WITH LEAD TETRAFLUORIDE

Earl T. McBee, La Fayette, Ind., and Richard M. Robb, Wilmington, Del., assignors to Purdue Research Foundation, La Fayette, Ind., a corporation of Indiana No Drawing. Application December 20, 1945, Serial No. 636,268

4 Claims. (Cl. 260—648)

1

This invention relates to organic compounds containing fluorine, particularly to saturated fluorine-containing halocarbons, and to a method for the preparation thereof. This application is a continuation in part of applications Serial No. 552,016, filed August 30, 1944, now U. S. Patent No. 2,533,132, issued December 5, 1950, Serial No. 568,939, filed December 19, 1944, and Serial No. 572,257, filed January 10, 1945, now abandoned.

The preparation of fluorine-containing halocarbons, i. e., of fluorine-containing compounds composed entirely of carbon and halogen, has, in most instances, heretofore been attended with considerable difficulty. It is well known that elemental fluorine generally may not be reacted with organic compounds, even with halohydrocarbons containing a low proportion of hydrogen, and the reaction controlled so as to produce a desired fluorine-containing halocarbon. Although certain halogens other than fluorine, e. g., chlorine and bromine, may react with a wide variety of organic compounds under suitable conditions to give high yields of valuable products, the reaction of fluorine with most organic compounds is violent in nature and is usually accompanied by profound decomposition of the organic compound. In most cases, reaction occurs with explosive violence in spite of extreme measures which may be taken to moderate its effect. In many instances, the reaction products consist mainly of carbonaceous matter and hydrogen fluoride or of other equally undesirable products. When using a large excess of fluorine the principal products are generally carbon tetrafluoride and hydrogen fluoride.

Many attempts have been made to use fluorinating agents other than elemental fluorine to replace halogen or hydrogen in organic compounds to obtain desired fluorine-containing organic compounds, e. g., fluorine-containing halocarbons. Among the fluorinating agents which have been tried may be mentioned hydrogen fluoride, antimony trifluoride, mercuric fluoride, iodine pentafluoride, bromine trifluoride, chlorine trifluoride, and many others. Although certain of these agents may, under certain conditions, replace with fluorine a certain proportion of an existing halogen atom other than fluorine already in a halocarbon molecule, many of these agents are in general expensive to prepare and inconvenient to work with. Furthermore, highly fluorinated compounds, e. g., perfluorinated compounds, are not usually obtained readily from the corresponding highly chlorinated, brominated

2 or iodinated compounds using such agents. Certain of the agents referred to, e. g., bromine trifluoride, react with many organic compounds with explosive violence.

Most metal fluorides heretofore proposed as agents to replace chlorine, bromine or iodine in organic compounds with fluorine tend, under the conditions necessary to obtain a high degree of exchange of halogen, to produce polymerized or unsaturated break-down products and frequently do not lead to complete or uniform replacement of chlorine, bromine or iodine with fluorine. For these and other reasons fluorine-containing halocarbons have not heretofore been available except in a few instances, and industry has been deprived of many members of this valuable group of compounds. The need for new and improved procedures for the preparation of fluorine-containing halocarbons is evident.

It is, therefore, an object of the present invention to provide a method for the preparation of fluorine-containing halocarbons. Still a further object is to provide a method whereby saturated fluorine-containing halocarbons, including fluorocarbons, may be prepared from completely chlorinated, brominated or iodinated saturated hydrocarbons. An additional object is to provide a method whereby fluorine-containing halocarbons may be prepared from completely halogenated hydrocarbons containing two or more different halogens. An additional object is to provide a method for increasing the fluorine content of a halocarbon containing fluorine and another halogen. An additional object is to provide a method for preparing a fluorine-containing halocarbon whereby the formation of undesirable decomposition or polymerization products is substantially avoided. An additional object is to provide a method for fluorinating a halocarbon containing a halogen other than fluorine whereby a predetermined degree of fluorination may be effected readily. An additional object is to provide a fluorination method which is not subject to certain of the disadvantages set forth above. Still a further object is to provide a novel fluorinating agent capable of replacing established halogen other than fluorine in saturated halocarbons with fluorine. Still an additional object is to provide certain new and novel fluorine-containing halocarbons, including fluorocarbons and other highly fluorinated products. Other objects will become apparent from the following specification and claims.

According to the present invention the foregoing and related objects are accomplished readily and economically by contacting a saturated halocarbon containing in the molecule at least one atom of halogen other than fluorine with lead tetrafluoride under suitable reaction conditions until a desired degree of replacement with fluorine of said halogen other than fluorine has occurred and separating from the reaction mixture a halocarbon containing at least a higher proportion of fluorine than the halocarbon fluorinated. Lead tetrafluoride has been found to be an excellent fluorinating agent for replacing with fluorine halogen other than fluorine in saturated halocarbons and, when the fluorination reaction is carried out under conditions hereinafter described, the reaction can be controlled without difficulty.

Substantially any desired proportion of the maximum theoretical amount of fluorine can be introduced into the halocarbon with the formation of little or no decomposition or polymerization products. Saturated aliphatic and alicyclic halocarbons, including fused-ring halocarbons and polycarbocyclic non-fused-ring halocarbons, can be converted readily to fluorine-containing halocarbons. Chlorine, bromine and iodine present in the halocarbon reactant can be replaced partially or completely with fluorine, as desired. Examples of saturated, fluorine-containing halocarbons containing at least one halogen atom other than fluorine which may be prepared by the method of the invention include monochlorotrifluoromethane, dichlorodifluoromethane, trichloromonofluoromethane, tetrachlorodifluoroethane, dichlorotetrafluoroethane, monobromomonochlorotetrafluoroethane, monobromopentafluoroethane, dichlorodecafluorocyclohexane, dichlorotetradecafluoroheptane, pentafluoromonoiodoethane, undecachloroundecafluorobicyclohexyl, dichlorohexadecafluoronaphthalene, and many others. Saturated fluorine-containing halocarbons containing at least one halogen atom other than fluorine in the molecule, such as those just mentioned may be fluorinated to form saturated halocarbons of increased fluorine content, including fluorocarbons, if desired.

According to one modification of the present invention, saturated fluorocarbons, i. e., saturated compounds containing only carbon and fluorine, may be obtained by contacting a saturated halocarbon containing at least one atom of halogen other than fluorine in the molecule with lead tetrafluoride as an active fluorinating agent under such conditions and for such time that all of such halogen atoms other than fluorine in the molecule is replaced by fluorine. Examples of fluorocarbons which may be prepared by such perfluorination procedure include carbon tetrafluoride, hexafluoroethane, dodecafluoropentane, dodecafluorocyclohexane, tetradecafluoromethylcyclohexane, perfluorobicyclohexyl, perfluoronaphthalene, and many others.

In certain instances, rupture of the molecule may be effected with the formation of saturated fluorine-containing halocarbons having fewer carbon atoms in the molecule than does the original halocarbon fluorinated. This is herein referred to as fluorinolysis. Thus, for example, high molecular weight saturated halocarbons may be converted largely to high molecular weight fluorine-containing halocarbons, to high molecular weight saturated fluorocarbons, or, under more vigorous reaction conditions to saturated fluorine-containing halocarbons or fluorocarbons having fewer carbon atoms in the molecule, such as hexafluoroethane and even carbon tetrafluoride, if desired.

Although the fluorination reaction is exothermic, it proceeds without explosive violence and may be controlled readily so as to produce a halocarbon containing substantially any desired proportion of fluorine. The fluorination reaction is carried out at a temperature between about 0° C., or somewhat lower, and about 500° C., or somewhat higher, preferably between about 20° C. and about 450° C.

During the course of the reaction, the lead tetrafluoride used as a fluorinating agent, is converted to lead difluoride from which lead tetrafluoride may be regenerated readily by exposing the difluoride to elemental fluorine at an elevated temperature. The reaction may thus be carried out in cyclical manner, the lead tetrafluoride being first contacted with a saturated halocarbon reactant to produce a desired saturated fluorine-containing halocarbon and the spent lead tetrafluoride, consisting largely of lead difluoride, then regenerated with elemental fluorine and the cycle repeated. Furthermore, it may be desirable in some instances when a highly fluorinated saturated halocarbon is desired, to effect only partial fluorination in the first passage of the halocarbon reactant through the fluorination reactor and then to recycle the fluorine-containing product over regenerated or fresh lead tetrafluoride to increase the proportion of fluorine in the halocarbon molecule. Recycling of the fluorine-containing halocarbon as well as of the lead fluoride may be continued until the fluorocarbon is obtained, if desired.

Lead tetrafluoride is a solid which is unstable in the presence of water or atmospheric moisture. The compound is substantially stable, when dry, at temperatures as high as 500° C. and higher. Lead tetrafluoride may be prepared readily in a number of ways, one convenient way being by the treatment of anhydrous lead difluoride with elemental fluorine at an elevated temperature, e. g., at a temperature above about 150° C., preferably at a temperature between about 250° and about 500° C. Lead difluoride may be prepared readily by treating anhydrous lead dichloride with hydrogen fluoride at temperatures above about 150° C., and in many other ways.

In practicing the invention, it has been found convenient to place anhydrous lead dichloride in the reaction vessel in which the subsequent fluorination of a halocarbon is to be carried out, and then to treat the lead dichloride in the vessel, first with hydrogen fluoride and then with elemental fluorine, under the said requisite conditions of temperature. Following the fluorination of a saturated halocarbon the spent lead tetrafluoride, which contains a large proportion of lead difluoride, may be regenerated and the difluoride reconverted to the tetrafluoride by passing elemental fluorine over it at an elevated temperature. Thus, the consumption of lead salts in the process is reduced to a minimum and consists only of such negligible quantities as may be lost mechanically during the process.

Fluorination of a saturated halocarbon with lead tetrafluoride may be carried out in any convenient manner and in any convenient type of apparatus. It has been found satisfactory to dispose the lead tetrafluoride in a thin layer, e. g., in a layer from about one-half to about one inch thick, on shelves or trays within the reaction vessel or directly on the floor of the vessel itself and to 350° C. The product obtained by cooling the effluent vapors from the reactor and treating the condensate with alkali to remove free halogen and acidic substances consists of substantial proportions of dichlorodecafluorocyclohexane, monochloroundecafluorocyclohexane, and perfluorocyclohexane.

The fractions obtained which contained one and two chlorine atoms in the molecule were each recycled through a fluorination reactor containing lead tetrafluoride at 300° to 350° C. and the effluent vapors treated as described above. In each instance the reaction product contained a high proportion perfluorocyclohexane.

*Example 6*

Hexachloroethane is heated in a vessel to a temperature of about 180° C. and a stream of nitrogen passed through the vessel. The mixture of nitrogen and of vapors of hexachloroethane are conducted through a reactor filled with finely granulated lead tetrafluoride heated at a temperature of 300° to 350° C. The effluent vapors are collected in a cooled receiver, the condensate washed with water and dilute alkali and fractionally distilled. Substantial fractions of dichlorotetrafluoroethane and trichlorotrifluoroethane are thus obtained.

Upon recycling the two fractions just mentioned through a heated fluorination reactor containing lead tetrafluoride and collecting and purifying the reaction product as before, perhaloethanes of increased fluorine content, including perfluoroethane, are obtained.

Other saturated halocarbons containing at least one halogen atom other than fluorine which are reacted with lead tetrafluoride in a manner similar to those described in the foregoing examples to yield compounds in which either all or a part of the halogen other than fluorine has been replaced with fluorine include trichloromonobromomethane, tetrabromodichloroethane, pentachloromonoiodoethane, pentachloropentafluorobutane, monobromomonochlorotetrafluoroethane, tetrachlorodecafluoromethylcyclohexane, tetrachlorotetradecafluorodecahydronaphthalene, and many others.

We claim:

1. The process for the fluorination of a saturated polycarbon halocarbon to replace, with fluorine, all halogen atoms other than fluorine with retention of the carbon skeleton of the molecule, which includes the steps of (1) vaporizing a saturated polycarbon halocarbon containing in the molecule at least one halogen atom other than fluorine, (2) heating the vapor of the saturated halocarbon in contact with lead tetrafluoride in a reaction zone maintained at a temperature between about 150 and 500 degrees centigrade to cause replacement, with fluorine, of all halogen atoms other than fluorine in the molecule, and (3) condensing from the effluent product a saturated compound containing only carbon and fluorine and having the same carbon skeleton as the starting saturated polycarbon halocarbon.

2. The process of claim 1, wherein the starting halocarbon is a polycarbon alkane halocarbon.

3. The process of claim 1, wherein the starting halocarbon is a 2-carbon-atom halocarbon.

4. The process of claim 1, wherein the starting halocarbon is a chlorofluorocyclohexane.

EARL T. McBEE.
RICHARD M. ROBB.

REFERENCES CITED

The following references are of record in the file of this patent:

UNITED STATES PATENTS

| Number | Name | Date |
|---|---|---|
| 2,004,932 | Daudt et al. | June 18, 1935 |
| 2,013,035 | Daudt et al. | Sept. 13, 1935 |
| 2,024,008 | Midgley et al. | Dec. 10, 1935 |
| 2,062,743 | Daudt et al. | Dec. 1, 1936 |
| 2,192,143 | Midgley et al. | Feb. 27, 1940 |
| 2,220,713 | Grosse et al. | Nov. 5, 1940 |
| 2,238,242 | Balon et al. | Apr. 15, 1941 |
| 2,423,045 | Passino et al. | June 24, 1947 |

FOREIGN PATENTS

| Number | Country | Date |
|---|---|---|
| 214,293 | Great Britain | Apr. 14, 1924 |
| 3141/31 | Australia | Jan. 20, 1933 |
| 429,591 | Great Britain | May 28, 1935 |
| 786,123 | France | June 3, 1935 |

OTHER REFERENCES

Henne et al.: J. A. C. S., vol. 63, pages 3478–3479 (1941).

Dimroth et al.: Ber. deutsch Chem. Ges., vol. 64, pages 516–522 (1931).

Wartenberg: Zeitschr. anorg. allgem. chem., vol. 244, pages 337–347 (1940).

Moissan: "Comptes rendus," vol. 130, pages 622, 627 (1900).

Ruff and Giese: "Zeit. Anorg. Allgem. Chem.," vol. 219, pages 143 to 148 (1934).